United States Patent [19]
Gangwal et al.

[11] Patent Number: 5,928,980
[45] Date of Patent: Jul. 27, 1999

[54] ATTRITION RESISTANT CATALYSTS AND SORBENTS BASED ON HEAVY METAL POISONED FCC CATALYSTS

[75] Inventors: Santosh Gangwal, Cary, N.C.; Kandaswamy Jothimurugesan, Hampton, Va.

[73] Assignee: Research Triangle Institute, Research Triangle Park, N.C.

[21] Appl. No.: 08/795,669

[22] Filed: Feb. 6, 1997

[51] Int. Cl.$^6$ .............. B01J 20/34; B01J 23/22; B01J 23/755
[52] U.S. Cl. .............. 502/20; 502/22; 502/337; 502/353
[58] Field of Search ............... 502/20, 22, 337, 502/353

[56] References Cited

U.S. PATENT DOCUMENTS

| | | | |
|---|---|---|---|
| 4,207,204 | 6/1980 | McKay et al. | 252/611 R |
| 4,238,317 | 12/1980 | Vasalos et al. | 208/120 |
| 4,276,150 | 6/1981 | McHenry | 208/120 |
| 4,485,183 | 11/1984 | Miller et al. | 502/25 |
| 4,613,724 | 9/1986 | Debras et al. | 585/824 |
| 4,830,734 | 5/1989 | Nagji et al. | 208/208 R |
| 4,849,202 | 7/1989 | Lee | 423/574 R |
| 4,888,316 | 12/1989 | Gardner et al. | 502/20 |
| 4,954,244 | 9/1990 | Fu et al. | 208/120 |
| 5,021,145 | 6/1991 | Chapple | 208/120 |
| 5,154,819 | 10/1992 | Clark et al. | 208/216 R |
| 5,250,482 | 10/1993 | Doctor | 502/5 |
| 5,260,240 | 11/1993 | Guthrie et al. | 502/41 |
| 5,286,691 | 2/1994 | Harandi et al. | 502/41 |
| 5,324,417 | 6/1994 | Harandi et al. | 208/85 |
| 5,372,704 | 12/1994 | Harandi | 208/74 |
| 5,389,233 | 2/1995 | Senn | 208/120 |

OTHER PUBLICATIONS

*Oil and Gas Journal*, R. Schmitt, Nov. 18, 1991, p. 101.
*Oil and Gas Journal*, Elvin and Pavel, Jul. 22, 1991, p. 94.
Commercial Preparation of Industrial Catalysts, *Catalysis in Practice*, Ciapetta et al., edited by C. H. Collier, Reinhold, New York, 1957 (Chapter 2), April.

*Primary Examiner*—Michael Lewis
*Assistant Examiner*—Alexander G. Ghyka
*Attorney, Agent, or Firm*—Alston & Bird LLP

[57] ABSTRACT

A heavy metal poisoned, spent FCC catalyst is treated by chemically impregnating the poisoned catalyst with a new catalytic metal or metal salt to provide an attrition resistant catalyst or sorbent for a different catalytic or absorption processes, such as catalysts for Fischer-Tropsh Synthesis, and sorbents for removal of sulfur gasses from fuel gases and flue-gases. The heavy metal contaminated FCC catalyst is directly used as a support for preparing catalysts having new catalytic properties and sorbents having new sorbent properties, without removing or "passivating" the heavy metals on the spent FCC catalyst as an intermediate step.

24 Claims, No Drawings

ATTRITION RESISTANT CATALYSTS AND SORBENTS BASED ON HEAVY METAL POISONED FCC CATALYSTS

This invention was made with Government Support under Contract No. DE-FG22-95MT95011 awarded by the United States Department of Energy. The Government has certain rights in this invention.

FIELD OF THE INVENTION

This invention relates to highly attrition resistant catalysts and sorbents for use in fluidized-bed reactors (FBRs) and slurry bubble column reactors (SBCRs), and to processes of preparing the same.

BACKGROUND OF THE INVENTION

Attrition resistance is an important aspect of fluidizable particles, such as catalysts, sorbent materials, reaction surface supports and the like. Fluidizable particles in fluidized beds are used in numerous chemical conversion applications, including catalytic conversions, absorption reactions, and the like. These materials are needed for numerous fluidized bed reactor (FBR) and slurry bubble column reactor (SBCR) based processes where attrition can be a problem severe enough to cause very poor process economics, and in some cases, shut down of commercial processes. Examples of such processes include hot coal gas desulfurization using transport or bubbling-bed reactors, Fischer-Tropsch Synthesis using SBCRs, and flue-gas desulfurization using fluidized-bed reactors.

Fluid catalytic cracking (FCC) is a particularly well known and widely used process that relies on attrition resistant fluidizable catalysts. In this process, a heavy oil or similar hydrocarbon fraction is treated in a riser (transport) reactor with a particulate, attrition resistant aluminosilicate catalyst to "crack" the oil into smaller hydrocarbon chains, which are used to produce gasoline, heating oil, and the like. The catalyst rapidly cokes up in the riser reactor. It is then cyclically removed and heated in a bubbling-bed regenerator in the presence of oxygen. This removes the coke/carbon accumulated on or in the pores of the catalyst. The catalyst is thereafter recycled to the riser for use in the fluid catalytic cracking operation.

In practice, there is a limit to regeneration of FCC catalysts because regeneration can only remove the coke. See e.g., R. Hughes, *Deactivation of Catalysts,* Academic Press, New York, 1984. After repeated cycles of regeneration and reuse, the catalyst becomes unusable because of heavy metals primarily, nickel and vanadium, that accumulate on the surface and within the pores of the catalyst and interfere with the fluid catalytic cracking operation. Approximately 1000 tons/day of fresh FCC catalyst are used in petroleum refineries worldwide. From this approximately 500 tons/day of spent FCC catalyst are produced that need to be disposed of. Only 5% of this finds reuse in such applications as recycle for refinery as E-Cat, cement, asphalt, and brick. The remainder is disposed of by landfill.

Leachability tests applied to fresh, spent, and demetallized FCC catalyst, FCC catalyst fines, and bricks made by incorporating 5 weight % spent FCC catalyst confirms that a hazardous designation for these solids is not currently warranted. Nevertheless, concerns about the leachability of the spent FCC catalysts continues to be expressed [R. Schmitt, Oil and Gas Journal, Nov. 18 p.101 (1991); Environmental Reporter, U.S. Bureau of Nat. Affairs, p.310 (1992)].

Various processes have been proposed for regenerating heavy metal contaminated catalysts for reuse in the FCC process itself by treating the catalyst with an agent to demetallize or passivate heavy metals accumulated on the surface of the catalyst. For example, U.S. Pat. No. 4,207,204 to McKay et al. teaches treating a spent FCC catalyst with a crude antimony compound to passivate metals on the surface thereof, including vanadium, iron and/or nickel. U.S. Pat. No. 4,485,183 to Miller et al. teaches regenerating a spent FCC catalyst by treating the catalyst with a phosphorous compound. U.S. Pat. No. 4,954,244 to Fu et al. teaches reactivating a spent, metal contaminated FCC catalyst by contacting the catalyst with a dissolved ammonium compound, a fluorine compound, and a passivating agent, preferably magnesium, calcium, boron, aluminum, phosphorous, and/or antimony. Elvin and Pavel [Oil and Gas Journal, p. 94, Jul. 22 (1991)] describe an elaborate process named DEMET for metal reclamation from spent FCC catalyst involving calcining, sulfiding, chlorination, drying and recycling of the demetallized FCC catalyst to the FCC process.

Other proposals for regenerating spent FCC catalysts for use in the FCC process involve treating the spent catalyst with metals selected from groups IA and IIA of the Periodic Table of Elements. For example, U.S. Pat. No. 5,021,145 to Chapple teaches regenerating catalysts contaminated with vanadium by treating the catalyst with heavier alkaline earth metal oxides. U.S. Pat. No. 5,260,240 to Guthrie et al. teaches demetallizing the spent FCC catalyst with calcium or magnesium containing additives such as dolomite and sepiolite in an external reactor at 730° C. in the presence of steam. U.S. Pat. No. 5,154,819 to Clark et al. teaches regenerating catalysts by impregnating a spent FCC catalyst with a group IIA metal. U.S. Pat. No. 5,389,233 to Senn teaches regeneration of a spent FCC catalyst by treatment with a lithium containing compound.

Attempts are also being made to develop processes for separation of the potentially active and inactive particles for the FCC process from the spent FCC catalyst using magnetic separation and other techniques. U.S. Pat. No. 5,250,482 to Doctor teaches separation of spent FCC catalyst into several zones with differing levels of nickel, with the portion with the least amount of nickel being recycled back to the FCC unit. U.S. Pat. No. 5,286,691 to Harandi et al. teaches the addition of a metal getter additive to the FCC regenerator with a higher settling velocity. The metals are removed in this process by solid-solid interaction. The additive with the adsorbed metal is withdrawn from the lower portion of the regenerator.

Direct reuse (with no treatment) of spent FCC catalyst for milder cracking and less severe refinery operations has been suggested. For example, U.S. Pat. No. 4,276,150 to McHenry teaches the direct use of spent FCC catalyst for hydrocracking heavy oils and residues. U.S. Pat. No. 5,324,417 to Harandi teaches a process in which spent FCC catalyst is used for demetallizing and deemulsifying refinery sludge and slop oils. U.S. Pat. No. 5,372,704 to Harandi and Owen teaches the use of spent FCC catalyst for recracking of naphtha fractions to lighter products and improve the octane number of the cracked naphtha.

Despite these and numerous other proposals for regenerating and/or reactivating spent FCC catalyst, some 475 tons/day of spent FCC are still disposed of by landfill operations. With growing environmental concern, land filling is becoming more costly and increasingly less desirable.

SUMMARY OF THE INVENTION

In accordance with the present invention, a heavy metal poisoned, spent FCC catalyst is treated by chemically impregnating the poisoned catalyst with a new catalytic metal or metal salt to provide an attrition resistant supported catalyst or supported sorbent useful for different catalytic or absorption processes, i.e., processes other than fluid catalytic cracking, such as catalysts for Fischer-Tropsh Synthesis, and sorbents for removal of sulfur gasses from fuel and flue gases and the like. In accord with the invention, the heavy metal contaminated FCC catalyst is directly used as a support for preparing catalysts having new catalytic properties and sorbents having new sorbent properties, without removing or "passivating" the heavy metals on the spent FCC catalyst as an intermediate step.

Spent FCC catalysts that are used to prepare supported catalytic and sorbent materials in accord with the invention, are readily available in commerce at a cost of typically less than one-half the cost of a fresh FCC catalyst, in some cases as little as one-tenth the cost of the fresh FCC catalyst, which is generally substantially less than the cost for the support for a fresh catalyst or sorbent for other fluidized catalytic and absorption processes. Moreover, because the spent FCC catalysts have been subjected to substantial residence in the FCC environment, the sorbents and catalysts of the invention comprising a spent FCC catalyst as a support, exhibit only extremely low levels of attrition loss and generate negligible fines during use.

The supported catalysts and sorbents of the invention have been found capable of providing catalytic conversion and absorption efficiencies comparable to conventionally supported and unsupported catalysts and sorbents. Catalysts and sorbents can be prepared according to the invention for use in virtually any process that uses a fluidized bed or slurry bubble column reactor including Fischer-Tropsch Synthesis, hydrotreating/hydrocracking, flue-gas and fuel-gas desulfurization, direct sulfur recovery, and numerous other processes.

According to one aspect of the invention, a poisoned FCC catalyst is used to prepare a supported sorbent for hot-gas desulfurization process for removal of sulfur gases (primarily $H_2S$) from fuel gases and the like by impregnating the poisoned catalyst with a precursor of a metal oxide capable of absorbing reduced sulfur compounds from a fluid stream and thereafter treating the impregnated FCC catalyst to convert the metal salt to supported metal oxide. Preferably, the spent FCC catalyst is impregnated with a salt of zinc and/or iron, with or without other metal salts, more preferably including at least one zinc salt such as zinc nitrate, and is thereafter calcined in an oxygen-containing atmosphere to convert the metal salt to a metal oxide, e.g., to convert the zinc salt to zinc oxide.

In another preferred aspect of the invention, a poisoned FCC catalyst is used to prepare a supported sorbent for removal of $SO_2$ from combustion flue gas by impregnating the poisoned catalyst with a precursor of a metal oxide capable of absorbing $SO_2$ from a fluid stream and thereafter treating the impregnated FCC catalyst to convert the metal salt to supported metal oxide. Preferably the spent FCC catalyst is impregnated with a salt of copper or sodium, such as copper or sodium nitrate, with or without other metal salts, and is thereafter calcined in an oxygen-containing atmosphere to convert the metal salt to a metal oxide, d.g. to convert the copper salt to copper oxide.

In another preferred aspect of the invention, a poisoned FCC catalyst is used to prepare a supported catalyst for Fischer-Tropsh Synthesis by impregnating the poisoned catalyst with a precursor of a Group VIII metal and converting the Group VIII metal precursor to a supported Group VIII metal. Preferably, the spent FCC catalyst is impregnated with a cobalt and/or iron salt, and is thereafter calcined in an oxygen-containing environment to convert the salt to oxide, and is thereafter heated in a reducing gas atmosphere to convert the cobalt and/or iron oxide to cobalt and/or iron.

DETAILED DESCRIPTION OF THE PREFERRED EMBODIMENT

In the following detailed description, preferred embodiments of the invention are described to enable practice of the invention. Although specific terms are used to describe and illustrate the preferred embodiments, such terms are not intended as limitations on practice of the invention. Moreover, although the invention is described with reference to the preferred embodiments, numerous variations and modifications of the invention will be apparent to those of skill in the art upon consideration of the foregoing and following description.

Attrition resistant catalysts and sorbents of the invention are prepared using spent fluid-cracking catalyst (FCC). These materials are readily available in commerce as a waste product from refineries. The spent FCC catalysts are typically based on synthetic zeolitic materials although other silica-alumina based materials can also be used. In general, the spent FCC catalysts used in the invention have a BET surface area of less than 200 $m^2/g$ and include a total nickel and vanadium impurity content of greater than about 200 parts per million by weight (ppm), more typically greater than about 500 ppm, most typically greater than about 800 ppm. Typical physical properties and cost of spent FCC catalysts, as compared to fresh FCC catalysts, are shown in Table 1, below.

TABLE 1

| | Comparison of Spent and Fresh FCC Catalysts | |
|---|---|---|
| | Spent FCC Catalyst | Fresh FCC Catalyst |
| Cost ($/lb.) | 0.075 to .34 | 0.75 to 1.50 |
| Size Distribution ($\mu M$) | 40–150 | 40–150 |
| Fines Below 40 $\mu M$ (%) | negligible | 30 |
| Availability | excellent | excellent |
| Bulk Density (lb./cu ft.) | 54 | 54 |
| BET Surface Area ($m^2/g$) | 50–175 | >300 |
| Inertness | high | low |
| 5 hour Attrition Loss (%) | 0.4 | 2.6 |
| 20 hour Attrition Loss (%) | 1.2 | 8.0 |

As can be seen from Table 1, above, the cost of spent FCC catalyst can be as little as one-tenth of the cost of fresh FCC catalyst. Nevertheless, spent FCC catalyst has less than one-sixth the attrition loss of fresh FCC catalyst, and negligible fines because it has already been exposed to a substantial history of abrasion. Additionally the spent FCC catalyst is substantially inert because it has already been exposed to 1300° F. in the FCC unit. In general, the fresh FCC catalyst exhibits a high surface area while in the spent FCC catalyst, a substantial portion of the surface area has been lost as a result of exposure to high temperature in the FCC environment. Nevertheless, the spent FCC catalyst still has a desirable surface area for many catalytic and sorbent applications. Moreover, the spent FCC catalyst exhibits attrition resistance, hardness, size distribution, and inertness that are ideal for numerous applications.

The attrition resistant catalysts and sorbent materials of the invention are typically prepared using techniques well known to the skilled artisan. Typically, the preferred spent FCC catalyst is obtained as a bottom discharge from a catalyst regenerator and is accordingly free of waste such as coke, fines, and the like, other than metal poisons composed primarily of nickel and vanadium. Thus no treatment is normally necessary to prepare the spent FCC catalyst for an impregnation treatment. Impregnation techniques are well known in the art and are disclosed for example in Ciapetta et al. "Chapter 2; Commercial Preparation of Industrial Catalysts": *Catalysis in Practice,* edited by C. H. Collier, Reinhold, N.Y., 1957 which is hereby incorporated by reference. Advantageously, the desired active catalytic materials are applied to the spent FCC support employing pore volume impregnation (incipient wetness), using a desired metal salt or salts in solution, followed by drying and calcination in an appropriate atmosphere, to convert the metal salt or salts into the desired catalytically active form to thereby produce the desired catalyst or sorbent with the desired metal loading. The particular catalytically active materials, and the loading thereof are selected based on the desired catalytic or sorbent end use of the material based on information well known in the art.

The sorbent and catalytic materials of the invention are applicable to and useful in numerous and various well known processes in which the metal poisons present on the spent FCC support have no substantial negative effect on the catalytic or sorbent process. Such processes include virtually any process that uses a fluidized bed reactor, including transport or bubbling bed, a slurry bubble column reactor, or the like. These reactors demand highly attrition resistant catalysts or sorbents.

Examples of preferred well known fluidized bed reactor processes for which catalysts and sorbents of the invention can be prepared include hot gas desulfurization processes for various fluid streams including fuel gases from gasification of any carbonaceous material that typically employ Group IIB, VIB, VIIB, and VIII metal-based catalytically active materials; flue-gas desulfurization processes for various fluid streams including flue gas from combustion of carbonaceous materials that typically employ Group IA and IB metal-based catalytically active materials; acrylonitrile synthesis from propylene, ammonia, and air typically employing Group VB metal-based catalytically active materials; maleic anhydride synthesis from butane typically employing Group VB metal-based catalytically active materials; olefin polymerization using any of various olefin streams including ethylene and the like and typically employing Group VIB metal-based catalytically active materials; vinyl acetate preparation from ethylene, acetic acid, and oxygen, typically employing Group VIII metal-based catalytically active materials; and processes for removal of $SO_x$ and $NO_x$ from flue gasses and similar gaseous streams typically employing Groups IA and IB metal-based catalytically active materials.

Examples of preferred well known slurry bubble column reactor processes for which catalysts and sorbents of the invention can be prepared include liquid-phase methanol synthesis from carbon monoxide and hydrogen, typically employing Groups IB and IIB metal-based catalytically active materials; Fischer-Tropsch Synthesis typically employing Group VIII metal-based catalytically active materials; conversion of methanol to methacrylate typically employing Groups VB, VIB, VIII metal-based catalytically active materials; the preparation of propylene oxide from propane and oxygen, typically employing Group IB metal-based catalytically active materials; heavy oil upgrading, e.g. hydrodesulfurization or hydrodenitrogenation employing any of various Groups VI, B and VIII metal-based catalytically active materials as will be known to the skilled artisan; hydrogenation of various petroleum oil fractions typically employing Group VIII metal-based catalytically active materials; and dimethyl ether preparation from methanol, typically employing Groups IB and IIB metal-based catalytically active materials.

Supported catalytic and sorbent materials for numerous other fluidized bed reactor and slurry bubble column reactor processes other than the specific examples listed herein can also be prepared according to the invention as will be apparent. Particularly desirable materials that can be prepared according to the invention using spent FCC catalysts, include supported catalysts and sorbents for three processes of current importance, namely hot-gas desulfurization, flue gas desulfurization, and Fischer-Tropsch Synthesis.

Preferred hot gas desulfurization sorbents of the invention are fluidizable, particulate sorbents comprising supported active zinc and/or iron compounds and are used in the desulfurization of coal gas. Coal represents our largest fossil energy source. The efficiency of converting the chemical energy stored in coal to electricity can be improved by first generating fuel gas via coal gasification, and then oxidizing the hot gas in either a turbine or a fuel cell. This approach, however, is complicated by the presence of sulfur in coal, which is converted to reduced sulfur species such as $H_2S$, COS, and $CS_2$ during gasification. Subsequently, during combustion of the fuel gas, the $H_2S$ oxidizes to $SO_2$ which is environmentally undesirable. In addition to environmental concerns, high concentrations of $H_2S$ can be corrosive to energy producing equipment and can adversely affect the performance of molten carbonate fuel cells due to sulfur poisoning of electrodes.

Highly attrition resistant, supported sorbents for removal of the undesirable sulfur species from fuel gases are prepared according to the present invention by impregnating a spent FCC catalyst with a zinc, iron or other Groups IIB, VIB, VIIB, or VIII metal salt solution, preferably zinc nitrate, by pore volume impregnation, and then calcining the impregnated support in an oxygen containing atmosphere.

Preferred flue gas desulfurization, supported sorbents of the invention are fluidizable, particulate sorbents based on active copper or sodium compounds and are used for $SO_2$ removal from coal combustion flue gas. Highly attrition resistant sorbents for removal of $SO_2$ from flue gases are prepared according to the present invention by impregnating a spent FCC catalyst with a copper or Group IA metal salt solution, preferably copper nitrate, by pore volume impregnation, and then calcining the impregnated sorbent in an oxygen-containing environment.

Supported catalysts for Fischer-Tropsh Synthesis are prepared according to the invention by impregnating a poisoned FCC catalyst with a precursor of a Group VIII metal, preferably a cobalt and/or iron salt, and thereafter converting the Group VIII metal precursor to a supported Group VIII metal oxide by calcining the impregnated support in an oxygen containing atmosphere, and thereafter converting the metal oxide to supported Group VIII metal, preferably by heating in a reducing gas atmosphere.

The following examples are provided to illustrate preferred embodiments of the present invention, and should not be construed as limiting thereof. In these examples, percent (%) means percent by weight unless otherwise indicated, l means liters, $\mu$ means microns, m²/g means meters square per gram, ppm means parts per million, ppmv means parts per million by volume, lbs means pounds, °C. means degrees Centigrade, sccm means standard cubic feet per minute, slpm means standard liters per minute, Mpa means megapascals and WHSV means hourly space velocity.

In the following examples, various spent FCC catalysts were used to prepare catalysts and sorbents of interest. These materials were designated FCC #1, FCC #2, FCC #8, and FCC #0 and were found to have the properties shown in Table 2, below. The materials were tested to evaluate their attrition resistance, using a standard 3-hole air-jet-ASTM attrition test. The results are shown in Table 3, below, together with the attrition resistance properties of a typical fresh FCC catalyst.

TABLE 2

Properties of Spent FCC Catalysts

| | Ni (wt %) | V (wt %) | Surface Area (m²/g) | APS ($\mu$) | Pore Volume (cm³/g) | $Al_2O_3$ (wt %) | Bulk Density (g/cc) | Cost ($/ton) |
|---|---|---|---|---|---|---|---|---|
| FCC #1 | 0.20 | 0.33 | 129 | 71 | — | 43.4 | 0.9 | 145 |
| FCC #2 | 0.02 | 0.03 | 182 | 80 | 0.29 | 36.9 | 0.92 | 675 |
| FCC #8 | 0.03 | 0.05 | 169 | 63 | 0.45 | 47.7 | 0.78 | 645 |
| FCC #0 | Obtained from FCC regeneration discharge of Mobil Oil Corporation's Beaumont Refinery, Surface area = 178 m²/g. | | | | | | | |

TABLE 3

Comparison of Typical Spent and Fresh FCC Catalysts

| | Attrition Resistance | | |
|---|---|---|---|
| | 5 hr. loss | 20 hr. loss | Cost (¢/lb) |
| Fresh | 2.6 | 8.1 | 75–150 |
| Spent | | | |
| FCC #0 | 0.4 | 1.2 | — |
| FCC #1 | 0.2 | 1.4 | 7.2 |
| FCC #2 | 0.00 | 0.4 | 34 |
| FCC #8 | 1.0 | 1.0 | 33 |

As can be seen from Tables 2 and 3, the spent FCC catalysts, FCC #1, FCC #2, FCC #8, and FCC #0 have the physical structure to act as catalytic and sorbent supports. They are highly attrition resistant (Table 3) and much less costly than fresh FCC. However, such spent FCC catalysts are no longer of substantial use in FCC processes because they have been poisoned by heavy metals.

The following examples demonstrate the utility of these materials as catalyst and sorbent supports in accordance with the invention. Specific applications are shown for hot-gas desulfurization and Fischer-Tropsch Synthesis. In addition these materials are also shown to have substantial utility in hydrotreating/hydrocracking, flue-gas desulfurization, and direct sulfur recovery processes.

EXAMPLE 1

A 15% zinc oxide supported sorbent was prepared, using the spent FCC catalyst designated FCC #0 as a support, by the incipient wetness technique. The concentration of $Zn(NO_3)_2.6H_2O$ in aqueous solution was adjusted to achieve 15 wt. % loading of ZnO on the FCC catalyst. The impregnated sorbent was dried at 120° C. and then calcined in an oxygen-containing atmosphere at 600° C. for 2 hours.

Two cycles of sulfidation and regeneration were carried out over the resultant sorbent. The sulfidation was carried out with 85% of coal gas (containing 0.6% $H_2S$, 12% $H_2$, 18% CO, 6% $CO_2$, and balance $N_2$) and 15% steam with 180 sccm total flow at 450° C. Regeneration of the sorbent to convert ZnS to ZnO was carried out with 3% $O_2$ and balance $N_2$ at 600° C. 18 grams of sorbent was used for these tests. The surface area of the fresh and sulfided samples were 104.9 and 95.8 m²/g, respectively.

The following results were found during the above tests. During the first cycle, the sulfidation was carried out for 3½ hours and no $H_2S$ breakthrough was observed by gas chromatograph-flame photometric detector (GC-FPD). The sulfided sorbents were then purged with $N_2$ for 30 minutes followed by regeneration at 600° C. The regeneration was stopped after 75 minutes when the flue gas contained ~2600 ppm of $SO_2$. The sorbents were then kept in $N_2$ and cooled to 450° C. overnight. The second cycle was started the following morning. The $H_2S$ breakthrough was undetectable for the first 2 hours and 45 minutes.

These results demonstrate that very high sulfur removal efficiency can be achieved with ZnO impregnated on spent FCC catalyst. It is particularly noteworthy that $H_2S$ remained undetectable prior to initial breakthrough, which indicates that the sorbent has a high reactivity and retains a high reactivity following regeneration.

EXAMPLE 2

A 15% iron supported catalyst was prepared, using the spent FCC catalyst designated FCC #0 as a support, by the incipient wetness technique. The concentration of $Fe(No_3)_3.9H_2O$ in aqueous solution was adjusted to achieve 15 wt. % $Fe_2O_3$ loading on the spent FCC catalyst. The impregnated catalyst was dried at 120° C. and then calcined in an oxygen-containing atmosphere at 450° C. for 5 hours. The resultant supported iron oxide catalyst was then reduced by hydrogen at 450° C. for 16 hours to convert the iron oxide to iron.

The supported iron catalyst prepared above was then used in the Fischer-Tropsch Synthesis reaction in a 1 gram reactor at 250° C., 1 Mpa and WHSV=0.77 and a 1:1 mixture by volume of carbon monoxide and hydrogen synthesis gas. The test was conducted for 24 hours.

The following results were found during the above tests. The carbon monoxide conversion was 23.6% and the hydrocarbon distribution over 24 hours was $C_1$=20.6%; $C_2$=15.4%, $C_3$=12.6%, $C_4$=25.2% and $C_5$–$C_{11}$=26.2%.

It is particularly noteworthy that no heavy waxes were produced. This indicates that the catalyst had cracked them resulting in increasing the gasoline fraction. This indicates that the catalyst of this example not only can be used in Fischer-Tropsch Synthesis, but can also be used in hydrotreating and hydrocracking reactions.

EXAMPLE 3

A 10% cobalt oxide supported catalyst was prepared, using the spent FCC catalyst designated FCC #0 as a support, by the incipient wetness technique. The concentration of $Co(NO_3)_2 \cdot 6H_2O$ was adjusted to achieve 10% Co loading on the spent FCC support. The impregnated catalyst was dried at 120° C. and then calcined at 450° C. on an oxygen-containing atmosphere for 5 hours. The BET surface area of this catalyst was 133 $m^2/g$. The catalyst was then reduced in a hydrogen stream at 450° C. for 16 hours to convert the cobalt to the zero valence state.

The resultant catalyst was then used in the Fischer-Tropsch synthesis reaction in a 1 gram reactor at 250° C., 1 Mpa, WHSV=0.77, and at a carbon monoxide to hydrogen ratio of 1 to 1. The carbon monoxide conversion was 36.1% and the hydrocarbon distribution over 24 hours was $C_1$=34.0%, $C_2$=5.2%, $C_3$=5.3%, $C_4$=16.5% and $C_5$ to $C_{11}$=39%.

It is highly noteworthy that like the catalyst of Example 2, this process produced no heavy waxes, again indicating that the catalyst had cracked them. Accordingly, the catalyst of this example can be used in Fischer-Tropsch Synthesis, and also in hydrotreating and hydrocracking reactions.

EXAMPLE 4

A 20% zinc oxide supported sorbent was prepared, using the spent FCC catalyst designated FCC #1 as a support, by the incipient wetness technique. The concentration of $Zn(NO_3)_2 \cdot 6H_2O$ in aqueous solution was adjusted to achieve 20 wt. % loading of ZnO on the FCC catalyst. The impregnated sorbent was dried at 120° C. and then calcined at 600° C. for 2 hours.

A sulfidation test was then carried out on this sorbent with a sulfidation gas containing 10% $H_2$, 15% CO, 5% $CO_2$, 0.4% $H_2S$, 15% $H_2O$, balance $N_2$ (volume %). At 900° F. sulfidation temperature, the stable conversion achieved by this sorbent was found to be 100%, and the pre-breakthrough $H_2S$ level in the desulfurized gas was found to be less than 100 ppm. Regeneration of this sorbent was conducted with 2 volume percent $O_2$ in $N_2$ at 550° C. Sulfidation and regeneration of the sorbent was repeated for a total of five cycles. The sorbent capacity and activity was stable for the 5 cycles it was tested for. The sulfur capacity of the sorbent was measured during cycle 4 and found to be 9.12 g(sulfur)/100 g of sorbent. The surface area of the fresh and sulfided samples were measured and found to be 79.4 and 63.1 $m^2/g$. The 5 hour and 20 hour attrition loss of the fresh sorbent were tested and found to be 0.0 and 0.62 wt. %, respectively in a standard 3-hole tester.

The high stable conversion achieved by the sorbent of this example indicates rapid kinetics and little or no loss of surface area in successive cycles.

EXAMPLE 5

A 20% iron oxide ($Fe_2O_3$) supported sorbent was prepared, using the spent FCC catalyst designated FCC #1 as a support, by the incipient wetness technique. The concentration of $Fe(NO_3)_3 \cdot 9H_2O$ in aqueous solution was adjusted to achieve 20 wt. % loading of $Fe_2O_3$ on the FCC catalyst. The impregnated sorbent was dried at 120° C. and then calcined in an oxygen-containing atmosphere at 650° C. for 2 hours.

A sulfidation test was carried out on this sorbent at 275 psig, 450° C., a flow rate of 18–75 slpm, and using 270 g of sorbent material. The gas composition was 15% CO, 10% $H_2$, 10% $CO_2$, 6–15% $H_2O$, 0.3% $H_2S$, and balance $N_2$ (by volume %). Regeneration was carried out using 50–75 volume % $SO_2$ at 580–625° C. Polishing regeneration was carried out using 1–2% $O_2$ in $N_2$ at 600–650° C. Ten cycles of sulfidation and regeneration were conducted during which the sorbent desulfurization activity and capacity was stable.

It was found during the tests that $H_2S$ was removed down to a level of less than 200 ppm (by volume). It was also found that during $SO_2$ regeneration of the sorbent, up to 80% of the sulfur loaded was directly recovered as elemental sulfur. The sorbent was tested for attrition resistance and it was found that the 5 hour and 20 hour attrition resistance, respectively, of the fresh sorbent of this example were 0.25% and 0.25% in a standard 3-hole tester. The 5 hour and 20 hour attrition resistance, respectively, of the sorbent after 10 cycles were 0.0 and 1.2 wt. %.

EXAMPLE 6

A 20% zinc oxide and 3% cobalt supported sorbent was prepared, using the spent FCC catalyst designated FCC #1 as a support, by the incipient wetness technique. The concentration of $Zn(NO_3)_2 \cdot 6H_2O$ and $Co(NO_3)_3 \cdot 6H_2O$ in aqueous solution were adjusted to achieve the desired loading on the spent FCC catalyst. The impregnated sorbent was dried at 120° C. and then calcined in an oxygen-containing atmosphere at 600° C. for 2 hours.

A sulfidation test was carried out on the resultant sorbent with a sulfidation gas containing 10% $H_2$, 15% CO, 5% $CO_2$, 0.4% $H_2S$, 15% $H_2O$, balance $N_2$ (volume %). Regeneration of this sorbent was conducted with 2 volume percent $O_2$ in $N_2$ at 550° C. Sulfidation and regeneration were repeated for a total of five cycles.

It was found that at 900° F. sulfidation temperature, the stable conversion, i.e., sulfur removal, achieved by the sorbent was 100% and the pre-breakthrough $H_2S$ level was less than 100 ppmv. The high stable conversion indicates rapid kinetics and little or no loss of surface area in successive cycles. The sulfur capacities of the sorbent of this example was measured during cycle 4 and was found to be 10.43 g(S)/100 g of sorbent. The activity and capacity of the sorbent were stable for all 5 cycles of the test. The surface area of the fresh and sulfided samples were found to be 78.6 and 71.9 $m^2/g$. The 5 hour and 20 hour attrition loss of the fresh sorbent were found to be 0.28 and 0.56 wt. %, respectively, in a standard 3-hole tester.

EXAMPLE 7

A 20% zinc oxide, 1.5% cobalt, and 1.5% nickel sorbent was prepared, using the spent FCC catalyst designated FCC #1 as a support, by the incipient wetness technique. The concentration of $Zn(NO_3)_2 \cdot 6H_2O$, $Co(NO_3)_3 \cdot 6H_2O$, and $Ni(NO_3)_3 \cdot 6H_2O$ in aqueous solution were adjusted to achieve the desired loading on the FCC catalyst. The impregnated sorbent was dried at 120° C. and then calcined in an oxygen-containing atmosphere at 600° C. for 2 hours.

A sulfidation test was carried out with a sulfidation gas containing 10% $H_2$, 15% CO, 5% $CO_2$, 0.4% $H_2S$, 15% $H_2O$, balance $N_2$ (volume %). Regeneration of this sorbent was conducted with 2 volume percent $O_2$ in $N_2$ at 550° C. Sulfidation and regeneration were repeated to achieve a total of five cycles. At 900° F. sulfidation temperature, the stable conversion achieved by this sorbent was found to be 100% and the pre-breakthrough $H_2S$ level was less than 100 ppmv.

The high stable conversion indicates rapid kinetics and little or no loss of surface area in successive cycles. The sulfur capacities of this sorbent was measured during cycle 4 and was found to be 11.98 g(S)/100 g of sorbent. The sorbent activity and capacity was stable for the 5 cycles of the test. The surface area of the fresh and sulfided samples were 82.1 and 71.5 m$^2$/g. The 5 hour and 20 hour attrition loss of the fresh sorbent were 0.36 and 0.36 wt. %, respectively, in a standard 3-hole tester.

EXAMPLE 8

A 20% zinc oxide, 1.5% cobalt, 1.5% nickel sorbent [was prepared, using the spent FCC catalyst designated FCC #2 as a support, by the incipient wetness technique. The concentration of $Zn(NO_3)_2.6H_2O$, $Co(NO_3)_3.6H_2O$, $Ni(NO_3)_3.6H_2O$ in aqueous solution was adjusted to achieve desired loading on the FCC catalyst. The impregnated sorbent was dried at 120° C. and then calcined in an oxygen-containing atmosphere at 600° C. for 2 hours.

A sulfidation test was carried out with a sulfidation gas containing 10% $H_2$, 15% CO, 5% $CO_2$, 0.4% $H_2S$, 15% $H_2O$, balance $N_2$ (volume %). Regeneration of this sorbent was conducted with 2 volume percent $O_2$ in $N_2$ at 550° C. Sulfidation and regeneration were repeated to achieve a total of five cycles.

It was found that at 900° F. sulfidation temperature, the stable conversion achieved by this sorbent was 100% and the pre-breakthrough $H_2S$ level was less than 100 ppmv. The high stable conversion indicates rapid kinetics and little or no loss of surface area in successive cycles. The sulfur capacities of this sorbent was measured during cycle 4 and was 11.98 gS/100 g of sorbent. The sorbent activity and capacity was stable for the 5 cycles of the test. The surface area of the fresh and sulfided samples were 99.8 and 90.8 m$^2$/g. The 5 hour and 20 hour attrition loss of the fresh sorbent were 0.56 and 1.41 wt. %, respectively, in a standard 3-hole tester.

EXAMPLE 9

A 20% zinc oxide, 1.5% cobalt, and 1.5% nickel sorbent was prepared, using the spent FCC catalyst designated FCC #8 as a support, by the incipient wetness technique. The concentration of $Zn(NO_3)_2.6H_2O$, $Co(NO_3)_3.H_2O$, $Ni(NO_3)_3.H_2O$ in aqueous solution was adjusted to achieve desired loading on the FCC catalyst. The impregnated sorbent was dried at 120° C. and then calcined in an oxygen-containing atmosphere at 600° C. for 2 hours.

A sulfidation test was carried out with a sulfidation gas containing 10% $H_2$, 15% CO, 5% $CO_2$, 0.4% $H_2S$, 15% $H_2O$, balance $N_2$ (volume %). Regeneration of this sorbent was conducted with 2 volume percent $O_2$ in $N_2$ at 550° C. Sulfidation and regeneration were repeated to achieve a total of five cycles.

At 900° F. sulfidation temperature, the stable conversion achieved by the sorbent was found to be 100% and the pre-breakthrough $H_2S$ level was less than 100 ppm. The high stable conversion indicates rapid kinetics and little or no loss of surface area in successive cycles. The sulfur capacities of this sorbent was measured during cycle 4 and was found to be 10.52 g(S)/100 g of sorbent. The sorbent capacity and activity was stable for the 5 cycles of the test. The surface area of the fresh sample was 100.9 m$^2$/g. The 5 hour and 20 hour attrition loss of the fresh sorbent were 0.0 and 1.1 wt. %, respectively, in a standard 3-hole tester.

EXAMPLE 10

A 4.5% zinc oxide, 15.5% iron oxide ($Fe_2O_3$) sorbent was prepared, using the spent FCC catalyst designated FCC #8 as a support, by the incipient wetness technique. The concentration of $Zn(NO_3)_2.6H_2O$ and $Fe(NO_3)_3.9H_2O$ in aqueous solution was adjusted to achieve the desired loading on the FCC catalyst. The impregnated sorbent was dried at 120° C. and then calcined in an oxygen-containing atmosphere at 650° C. for 2 hours.

A sulfidation test was carried out at 275 psig, 18–75 slpm, 450° C. with 270 g of material. The gas composition was 15% CO, 10% $H_2$, 10% $CO_2$, 6–15% $H_2O$, 0.3% $H_2S$ and balance $N_2$ (by volume %). Regeneration was carried out using 50–75 volume % $SO_2$ at 530–625° C. A polishing regeneration was carried out using 1–2% $O_2$ in $N_2$ at 530–620° C. Fifty cycles of sulfidation and regeneration were conducted during the test.

It was found that the sorbent's desulfurization activity and capacity was stable throughout all fifty cycles of the test. $H_2S$ was removed down to less than 100 ppm. During $SO_2$ regeneration, up to 80% of the sulfur loaded was directly recovered as elemental sulfur. The 5 hour and 20 hour attrition of the fresh sorbent, respectively, were 3.6 and 6.8 wt. %. The 5 hour and 20 hour attrition of the sorbent after 50 cycles were 1.2 and 5.0 wt. %.

EXAMPLE 11

A 20% zinc oxide, 1.5% cobalt, 1.5% nickel, and 1.5% zirconium sorbent was prepared, using the spent FCC catalyst designated FCC #8 as a support, by the incipient wetness technique. The concentration of $Zn(NO_3)_2.6H_2O$, $Co(NO_3)_3.6H_2O$, $Ni(NO_3)_3.6H_2O$, $ZrO(NO_3)_2.xH_2O$ in aqueous solution was adjusted to achieve desired loading on the FCC catalyst. The impregnated sorbent was dried at 120° C. and then calcined in an oxygen-containing atmosphere at 600° C. for 2 hours.

A sulfidation test was carried out with a sulfidation gas containing 10% $H_2$, 15% CO, 5% $CO_2$, 0.4% $H_2S$, 15% $H_2O$, balance $N_2$ (volume %). Regeneration was conducted at 550° C. with 2 volume % $O_2$ in $N_2$. Thirty cycles of sulfidation and regeneration were conducted during the test.

It was found that at 900° F. sulfidation temperature, the stable conversion achieved by the sorbent of this example was 100% and the pre-breakthrough $H_2S$ level was less than 50 ppmv. The activity and capacity of the sorbent was stable throughout all thirty cycles of the test.

EXAMPLE 12

A 20% zinc oxide, 1.5% cobalt, 1.5% nickel and 3.0% zirconium sorbent was prepared, using the spent FCC catalyst designated FCC #8 as a support, by the incipient wetness technique. The concentration of $Zn(NO_3)_2.6H_2O$, $Co(NO_3)_3.6H_2O$, $Ni(NO_3)_3.6H_2O$, $ZrO(NO_3)_2.xH_2O$ in aqueous solution was adjusted to achieve desired loading on the FCC catalyst. The impregnated sorbent was dried at 120° C. and then calcined in an oxygen-containing atmosphere at 600° C. for 2 hours.

A sulfidation test was carried out with a sulfidation gas containing 10% $H_2$, 15% CO, 5% $CO_2$, 0.4% $H_2S$, 15% $H_2O$, balance $N_2$ (volume %). Regeneration between cycles was conducted at the same conditions as in Example 11. Fifty cycles of sulfidation and regeneration were conducted during the test.

It was found that at 900° F. sulfidation temperature, the stable conversion achieved by the sorbent of this example was 100% and the pre-breakthrough H$_2$S level was less than 50 ppm. The sorbent activity and capacity was stable for all fifty cycles of the test.

EXAMPLE 13

A 10% cupric oxide sorbent was prepared, using the spent FCC catalyst designated FCC #8 as a support, by the incipient wetness technique. The concentration of Cu(NO$_3$)$_2$.2.5H$_2$) in aqueous solution was adjusted to achieve 10% CuO loading on the FCC catalyst. The impregnated sorbent was dried at 120° C. and calcined in an oxygen-containing atmosphere for 2 hours at 60° C.

The sorbent was sulfated using a gas containing approximately 2000 ppmv SO$_2$, 12 volume % O$_2$, 18 vol % H$_2$O and balance N$_2$ at 350° C. in a thermogravimetric analyzer. The sorbent gained about 1.5% weight in 30 minutes, indicating sulfidation, i.e., SO$_2$ capture to form CuSO$_4$.

As can be seen from the foregoing examples catalysts and sorbents of the invention can be prepared for numerous well known processes and applications including hot-gas desulfurization, Fischer-Tropsch Synthesis, hydrotreating, hydrocracking, flue-gas desulfurization, and direct sulfur recovery processes. The catalysts and sorbents are also applicable to numerous other applications as indicated previously, even though not specifically shown in the examples, as will be apparent to those skilled in the art from the foregoing.

The invention has been described in considerable detail with reference to various preferred embodiments. However numerous variations and modifications can be made without departing from the spirit and scope of the invention as described in the foregoing specification and claims.

That which is claimed is:

1. A process for the preparation of a fluidizable, particulate, attrition resistant, supported sorbent or catalyst comprising:
    impregnating a substantially spent, fluid catalytic cracking catalyst comprising fluid catalytic cracking metal poisons selected from the group consisting of nickel and vanadium, with at least one compound of a metal having catalytic or sorbent properties for a predetermined catalytic or absorption conversion process; and
    treating said impregnated substantially spent, fluid catalytic cracking catalyst to convert said metal compound to an active state for said predetermined conversion process and wherein said process is free of any steps to remove or passivate said metal poisons on said substantially spent fluid catalytic cracking catalyst.

2. The process of claim 1 wherein said predetermined conversion process comprises Fischer-Tropsch Synthesis.

3. The process of claim 1 wherein said predetermined conversion process comprises a petroleum oil hydrotreating process.

4. The process of claim 1 wherein said predetermined conversion process comprises a petroleum oil hydrocracking process.

5. The process of claim 1 wherein said predetermined conversion process comprises a flue-gas desulfurization process.

6. The process of claim 1 wherein said predetermined conversion process comprises a direct sulfur recovery process.

7. The process of claim 1 wherein said predetermined conversion process comprises a process for removal of sulfur gases from a fuel gas.

8. The process of claim 7 wherein said fuel gas comprises a fuel gas derived from coal.

9. The process of claim 8 wherein said sulfur gasses primarily comprise hydrogen sulfide.

10. The process of claim 1 wherein said predetermined conversion process is a catalytic process selected from the group consisting of maleic anhydride synthesis, olefin polymerization, vinyl acetate synthesis, liquid-phase methanol synthesis, Fischer-Tropsch Synthesis, conversion of methanol to methacrylate, preparation of propylene oxide, hydrotreating of a heavy petroleum oil fraction, and dimethyl ether preparation.

11. The process of claim 1 wherein said predetermined conversion process is an absorption process selected from the group consisting of hot gas desulfurization processes, removal of NO$_x$ from a flue gas stream, removal of SO$_x$ from a flue gas stream.

12. A particulate, attrition resistant, fluidizable catalyst or sorbent comprising:
    a substantially spent, fluid catalytic cracking catalyst support having a BET surface area of less than about 200 m$^2$/g and comprising at least about 200 ppm by weight of metal poisons selected from the group consisting of nickel and vanadium; and
    at least one metal or metal compound supported on said support and being in an active state for a predetermined catalytic or absorption conversion process
    said support being substantially free of passivating agents for said metal poisons.

13. The particulate, attrition resistant, fluidizable catalyst or sorbent of claim 12 wherein said predetermined conversion process comprises Fischer-Tropsch Synthesis.

14. The particulate, attrition resistant, fluidizable catalyst or sorbent of claim 12 wherein said predetermined conversion process comprises a petroleum oil hydrotreating process.

15. The particulate, attrition resistant, fluidizable catalyst or sorbent of claim 12 wherein said predetermined conversion process comprises a petroleum oil hydrocracking process.

16. The particulate, attrition resistant, fluidizable catalyst or sorbent of claim 12 wherein said predetermined conversion process comprises a flue-gas desulfurization process.

17. The particulate, attrition resistant, fluidizable catalyst or sorbent of claim 12 wherein said predetermined conversion process comprises a direct sulfur recovery process.

18. The particulate, attrition resistant, fluidizable catalyst or sorbent of claim 12 wherein said predetermined conversion process comprises a process for removal of sulfur gases from a fuel gas.

19. The particulate, attrition resistant, fluidizable catalyst or sorbent of claim 12 wherein said fuel gas comprises a fuel gas derived from coal.

20. The particulate, attrition resistant, fluidizable catalyst or sorbent of claim 12 wherein said sulfur gasses primarily comprise hydrogen sulfide.

21. The particulate, attrition resistant, fluidizable catalyst or sorbent of claim 18 wherein said metal or metal compound is at least one metal oxide selected from the group consisting of oxides of zinc, copper and iron.

22. The particulate, attrition resistant, fluidizable catalyst or sorbent of claim 18 wherein said metal or metal compound is at least one zero valent metal selected from the group consisting of cobalt and iron.

23. The particulate, attrition resistant, fluidizable catalyst of claim 12 wherein said predetermined conversion process is a catalytic process selected from the group consisting of maleic anhydride synthesis, olefin polymerization, vinyl acetate synthesis, liquid-phase methanol synthesis, Fischer-Tropsch Synthesis, conversion of methanol to methacrylate, preparation of propylene oxide, hydrotreating of a heavy petroleum oil fraction, and dimethyl ether preparation.

24. The particulate, attrition resistant, fluidizable sorbent of claim 12 wherein said predetermined conversion process is an absorption process selected from the group consisting of hot gas desulfurization processes, removal of $NO_x$ from a flue gas stream, removal of $SO_x$ from a flue gas stream.

* * * * *